United States Patent
Hursey et al.

(10) Patent No.: US 7,796,984 B2
(45) Date of Patent: Sep. 14, 2010

(54) AUTOMATED TAGGING OF TARGETED MEDIA RESOURCES

(75) Inventors: John Thomas Hursey, Lawrenceville, GA (US); Jeffrey Clinton Mikan, Cumming, GA (US)

(73) Assignee: AT&T Mobility II LLC, Atlanta, GA (US)

(*) Notice: Subject to any disclaimer, the term of this patent is extended or adjusted under 35 U.S.C. 154(b) by 384 days.

(21) Appl. No.: 11/652,109

(22) Filed: Jan. 11, 2007

(65) Prior Publication Data

US 2008/0171542 A1 Jul. 17, 2008

(51) Int. Cl.
*H04W 24/00* (2009.01)
(52) U.S. Cl. ............ 455/423; 455/414.1; 455/466
(58) Field of Classification Search ............ 455/466, 455/405–408, 418–425; 370/252; 705/14, 705/30–35; 707/102
See application file for complete search history.

(56) References Cited

U.S. PATENT DOCUMENTS

| | | | |
|---|---|---|---|
| 7,099,280 B1* | 8/2006 | Shaffer et al. | 370/252 |
| 7,483,385 B2* | 1/2009 | Collomb et al. | 370/252 |
| 2005/0213509 A1* | 9/2005 | Collomb et al. | 370/252 |
| 2005/0233733 A1* | 10/2005 | Roundtree et al. | 455/414.1 |
| 2006/0211415 A1* | 9/2006 | Cassett et al. | 455/423 |
| 2006/0280126 A1* | 12/2006 | Shaffer et al. | 370/252 |
| 2007/0094142 A1* | 4/2007 | Russell et al. | 705/52 |
| 2007/0195158 A1* | 8/2007 | Kies | 348/14.01 |
| 2008/0252727 A1* | 10/2008 | Brown et al. | 348/143 |
| 2009/0075635 A1* | 3/2009 | Russell et al. | 455/414.2 |

FOREIGN PATENT DOCUMENTS

EP 1460799 A1 * 9/2004

OTHER PUBLICATIONS

Ruiz, Pedro M., et al., "Improving User-Perceived QoS in Mobile and Wireless IP Networks Using Real-Time Adaptive Multimedia Applications", 13th IEEE International Symposium on Personal Indoor and Mobile Radio Communications, PIMRC 2002, vol. 3, No. 15, Sep. 2002.*

* cited by examiner

*Primary Examiner*—Jean A Gelin
*Assistant Examiner*—Nathan Taylor
(74) *Attorney, Agent, or Firm*—Moazzam & Associates, LLC

(57) ABSTRACT

The present disclosure provides systems and methods for tagging or identifying bad, faulty or objectionable media resource files in real time, as the media is playing, by users who are exposed to the media. The tagging is simple to use and easy to remember, allowing for increased use of the tagging process to identify, correct and replace bad, faulty or objectionable media.

9 Claims, 4 Drawing Sheets

AUTOMATED TAGGING OF TARGETED MEDIA RESOURCES

BACKGROUND OF THE INVENTION

1. Field of the Invention

The present invention relates generally to mobile telecommunications networks. More specifically, the present invention relates to transmitting signals between end-user clients and application servers for troubleshooting and other useful purposes.

2. Background of the Invention

As the integration between mobile services and internet services develops, mobile operators are providing more internet-like services. Since customers are downloading increasingly large amounts of data from mobile networks, there is a need for more sophisticated error reporting and customer services.

Internet usage is becoming more widespread and computers are becoming increasingly smaller and portable. Thus, there exists a growing vacuum for wireless handheld devices that can access multimedia and online resources. This vacuum is being filled from various directions in the form of faster data-transfer protocols, stronger standardization between technologies, increasingly powerful wireless devices, and large amounts of investment by cellular operators in ensuring that their networks can implement these technologies. What opportunities were once solely in the realm of the internet are now opening up in the cellular or mobile world. Already, media file downloading has become a lucrative business model. With the increasing availability of MP3 files, JPG images, and other resources for download, more cellular telephones are being used as portable music players, photo albums, video cameras, game consoles, etc. As the internet and cellular worlds merge, there is a growing need for smoother communication between devices and networks, and for cellular operators to be on top of things in terms of understanding common problems and providing better customer service.

In response to this growing integration, mobile telephone technology has come a long way from the 1st generation of analog cellular phones, known as 1G. The second generation, 2G, was based on 100% digital transmissions. This allowed for the transfer of both voice and data, including SMS and email. The most enduring standard of 2G has been the Global System for Mobile Communications, or GSM. GPRS technology was added to the GSM framework in 2.5G (en route to today's 3G). This paved the road for increasing use of the Internet over cellular phones. GPRS allowed packet-switching, allowing more efficient data transfer than 2G's circuit switching. Alongside 3G came increased bandwidth/frequencies for data-only, with lower incremental cost.

In defining the 3G standard, The 3rd Generation Partnership Project (3GPP) has standardized several network, signaling, and transport protocols. A good example of one such standardization is the network architecture of the IP Multimedia system (IMS). IMS basically describes a system by which mobile operators can offer and charge for discrete services that are usually available on the internet, alongside current services being offered. This architecture works with any packet-switching network, is IP-based, and therefore has tremendous potential for services like VoIP, push-to-talk, videoconferencing, IM, presence information, etc. An example of a standardized signaling protocol is the Session Initiation Protocol (SIP). SIP allows two elements in a network to find each other and open lines of communication easily, and is a significant part of IMS.

Currently the system is not as robust as a proper IP-based system such as the internet. If for any reason a customer is dissatisfied with a mobile internet service, it is not an easy task to report the problem. There has been a boom in the "push" part of the content delivery business, but two-way transfer between the customer and the mobile operator is still underdeveloped.

When dealing with media resources, the mobile operator should ideally be aware of any problems in their resource database. Typical examples of these problems include, but are not limited to, poor quality media, faulty/corrupted files, packet losses in transmission, mislabeled or non-existent media resources, offensive media resources and bottlenecks in the system.

Unfortunately, the symptoms of these problems are most often experienced on the customer's end. At this point, the mobile operator will benefit if the customer can report these symptoms to the operator. However, at present, this process is laborious and is cost and time-inefficient in many ways. This is because there are additional costs to the customer; the customer usually has to call the mobile operator, and wait to be routed to the correct person; the customer cannot provide all precise relevant information required, such as media type, exact time, error details, etc.; and Interactive Voice Response (IVR) systems are frustrating to use for most customers. There are additional costs to the operator as well, including: special equipment to monitor media resources 24/7; increased staff to handle customer complaints; and overall lower level of customer satisfaction.

In summary, telephone or communications companies cannot provide high quality service when they cannot fix small problems quickly. Thus, there is a need for a simple and efficient method to inform mobile operators about potential problems with their media resources; a method that requires almost no work at all on the customer's part, and that could actually incentivize the customer to report the problem.

SUMMARY OF THE INVENTION

The present invention addresses the need to detect bad media resources by providing a system for customers to "tag" the bad media in real-time. Depending on the transmission protocol being used, this tag can be received and analyzed by the mobile operator within a short amount of time (e.g., seconds) after the customer initiates the process. Upon receiving a bad media file or hearing poor voice quality, the customer can initiate a tagging process. The customer's mobile device will send a preliminary tag via the cellular network to the Application Server (AS). The AS will retrieve any additional related information from a resource database, and will store this report in an event log or trouble log. The data in this log can be analyzed and a troubleshooting sequence can be initiated.

The customer owns a mobile device that is equipped with error-reporting. When the customer detects a bad resource, such as a defective or missing media file, or poor voice quality, they may initiate a tagging process by typing in a predefined code. This tag can be initiated immediately or within a certain window of time after the customer detects the bad resource. Depending on the signaling protocol being used, the tag will traverse various elements in the cellular network before reaching its destination. One exemplary embodiment uses a Session Initiation Protocol (SIP) tag that will traverse various proxy servers before reaching a SIP-enabled AS. The AS then pulls up the related resource from a database, possibly invoking a Media Resource Function (MRF). The AS then compiles an error report with all relevant information, and stores this report in a trouble log for further analysis. The receipt of a tag could also be trigger an automated diagnostic routine. At this point, the customer is informed via the network that the problem is being solved.

Real-time tagging eliminates the need for any further research into when or where the problem occurred. Tagging these resources happens in real-time so all relevant data regarding the incident is available. Tagging can create a useful database of events with accurate data for improved troubleshooting of bad media, thereby saving the operator endless time and resources in diagnosing the problem.

In one exemplary embodiment, the present invention is a network system for communicating error details to a telecommunications operator. The network system includes a wireless device capable of transmitting a message over a cellular network; a unit that is capable of receiving the message; and a unit that is configured to combine the message with additional information and compile a report.

In another exemplary embodiment, the present invention is a network system for communicating error details regarding voice and multimedia resources to a telecommunications operator. The network system includes a wireless device capable of transmitting a message over a cellular network; one or more proxy servers to route the message; a unit that is capable of receiving the message; a database containing information related to the voice or media resource; a unit that is capable of retrieving information from said database; and a unit that is configured to combine the resource details with an error message to compile an error report.

In yet another exemplary embodiment, the present invention is a method for identifying problematic media resources in real time on a wireless communication network. The method includes recognizing problematic resources on the client side; assembling a preliminary report containing error details; sending preliminary report over the network to an application server; collecting related information from a media resource database; combining related information with a preliminary report to compile an error report; and using said error report to diagnose the problem.

DETAILED DESCRIPTION OF THE INVENTION

Figure 1:
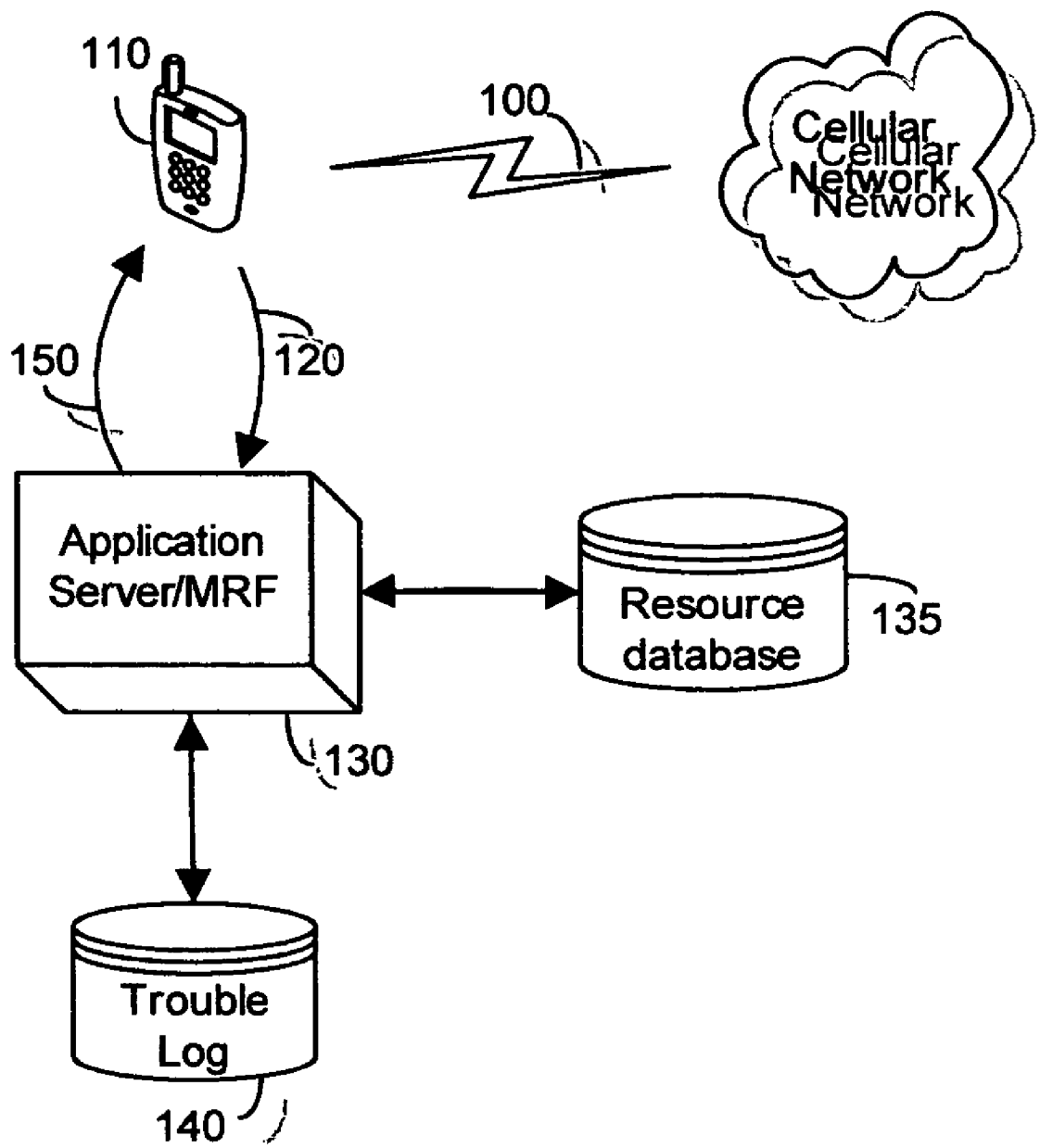
FIG. 1 shows a high-level schematic of a cellular device communicating an error with the cellular network, according to an exemplary embodiment of the invention.
Figure 2:
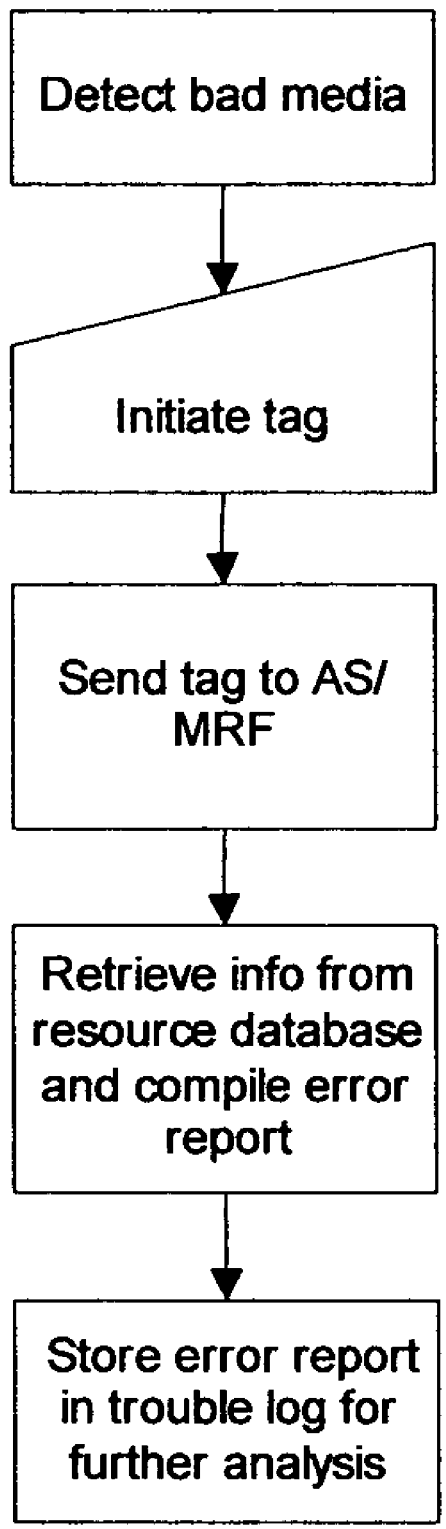
FIG. 2 shows a flowchart outlining the tagging process according to an exemplary embodiment of the invention.

The present invention addresses the need to increase awareness of faulty media resources by allowing the recipient of the resource to "tag" the media instantly. As shown in the system architecture of FIG. 1 and flowchart of FIG. 2, once the Client 110 recognizes a bad resource 100 from the cellular network, the Client 110 may initiate the tagging process. Depending on the signaling and transport protocol being used, the tag makes its way 120 through the cellular network before reaching the respective Application Server (AS) 130 that controls the resource. The AS 130 may then retrieve any associated information about the resource from a resource database 135, possibly invoking the Media Resource Function (MRF) in the process. The AS 130 will then compile a tag consisting of the initial tag and the additional information, and may store the tag in a trouble log 140 for further analysis.

The client may be any cellular telephone, wireline telephone, PDA, smartphone, PC-Card, or any other device that can receive data from a cellular network. The resource itself may have been transmitted via any current or future data-transfer protocol used in cellular networks, e.g., GPRS, CDMA, EDGE, 1xEVDO, etc. The resource may be streamed over the network or downloaded directly to the client. The data may be free or the client may have been billed for access to the resource. Alternatively, the resource could simply be voice audio from another client, or voicemail, or audio from a VoIP session.

Whatever form it may take, the resource may be "bad" for a number of reasons. For instance, the client may have received the wrong media resource, which could mean that a resource file is mislabeled on the server. Even if the correct clip is loaded, the file itself could be damaged or corrupted. Alternatively, there could also be problems in the transmission of the file for a variety of reasons such as packet losses, delay, jitter, or some other technical problem. Perhaps the media resource is incompatible with the client device or model. Also, with telecom companies offering such services as personalized greetings, ringing tones, or playback tones that are configured by another party, there is a risk that the client may find the clip offensive. For improved customer satisfaction, it would be vital to be able to tag these bad or offensive resources for further troubleshooting or investigation.

In any case, a bad resource has to be recognized as such before it can be tagged. In one exemplary embodiment, the customers themselves recognize a bad resource and can tag it immediately or within a preset window of time after the resource has been identified. The customer would download, view, or listen to the clip, decide that there is a problem with the clip, and then initiate the tagging procedure. This could likely be the case for mislabeled or potentially offensive resources. Alternatively, the bad resource could be recognized by an automated detection system that is part of the client. The detection system could be software or hardware based, and may detect errors in the data stream, or inconsistencies between the resource data and what the client requested. This program could inform the client user that the media resource is faulty or mislabeled, and could also initiate the tagging process on behalf of the user.

Once the resource has been identified, the next step is to create a preliminary "tag" to transmit to the cellular operator. This preliminary tag will contain all relevant information that is available at the time including, but not limited to: date and time; client phone number; client hardware or cell phone model; information on the media resource being tagged; and error code or details if available (missing data, corrupted stream, packet loss, bad filename, etc.).

Figure 3:
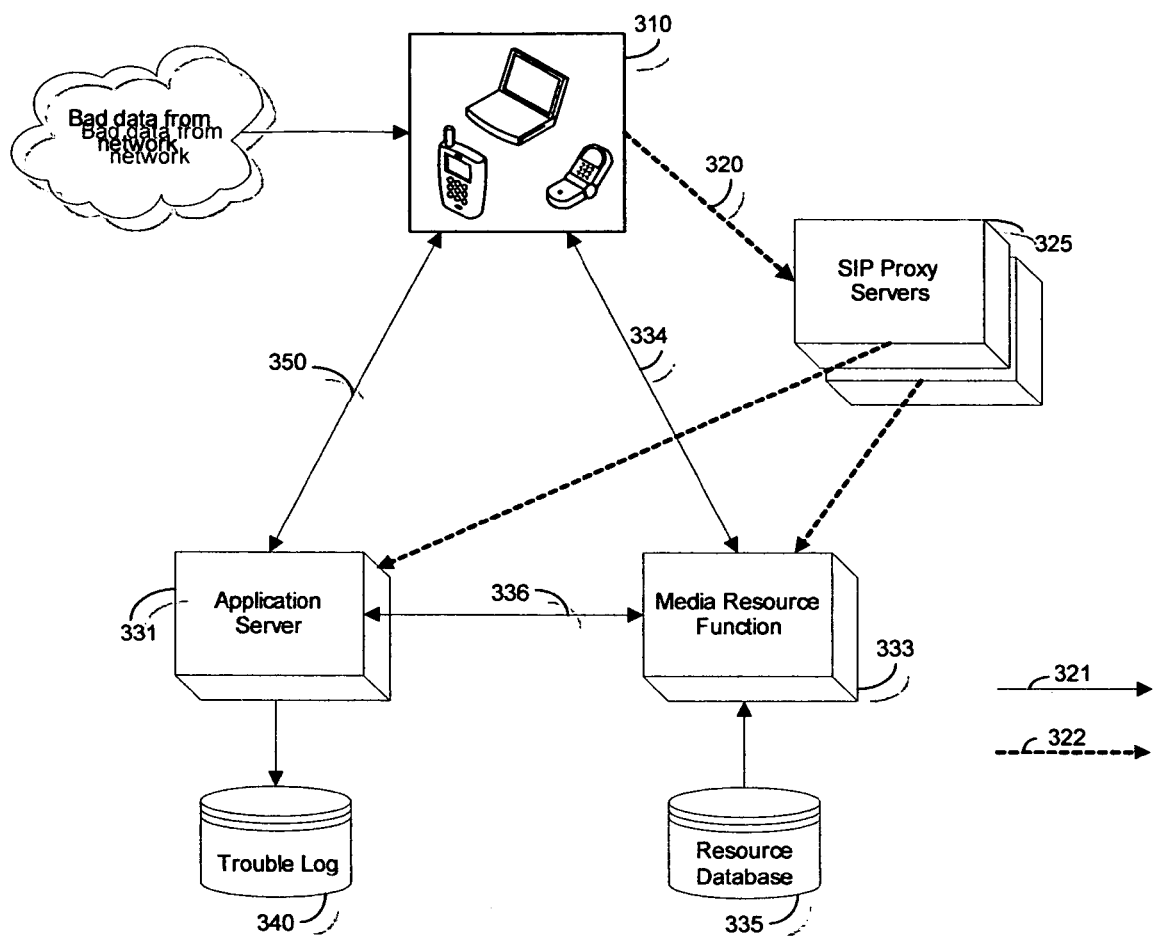
FIG. 3 shows a schematic of a process using SIP messaging to report a bad resource, according to an exemplary embodiment of the present invention.

The actual content of the tag will depend on the signaling protocol that will be used to transmit the tag. In one exemplary embodiment, as shown in FIG. 3, the client uses the Session Initiation Protocol (SIP) to transmit the tag. SIP is in increasing use today for a number of processes, especially in the VoIP realm. In this exemplary embodiment, the user could initiate the tagging process by typing in a predefined command, or the automated system could initiate the tagging process by assembling and transmitting the tag. In either case, the SIP-enabled client composes a SIP message with encoded details listed above and transmits the tag to the Media Resource Function (MRF) 333 or the Application Server (AS). An added extension to the protocol, SIP Instant Messaging and Presence Leveraging Extensions (SIMPLE), contains a MESSAGE function that can transmit instant messages with any text or binary content. Alternatively, the SIP-enabled client will initiate a session with the MRF/AS via SIP, and then use RTP or any equivalent protocol having similar functions to transmit the body of the tag to the MRF/AS. The benefits of using SIP are that it is flexible, there is no need for any intelligence (apart from routing) between the client and the server, and the technology is scaleable, in that any upgraded applications (including JAVA apps) on either end will be supported in the future.

Figure 4:
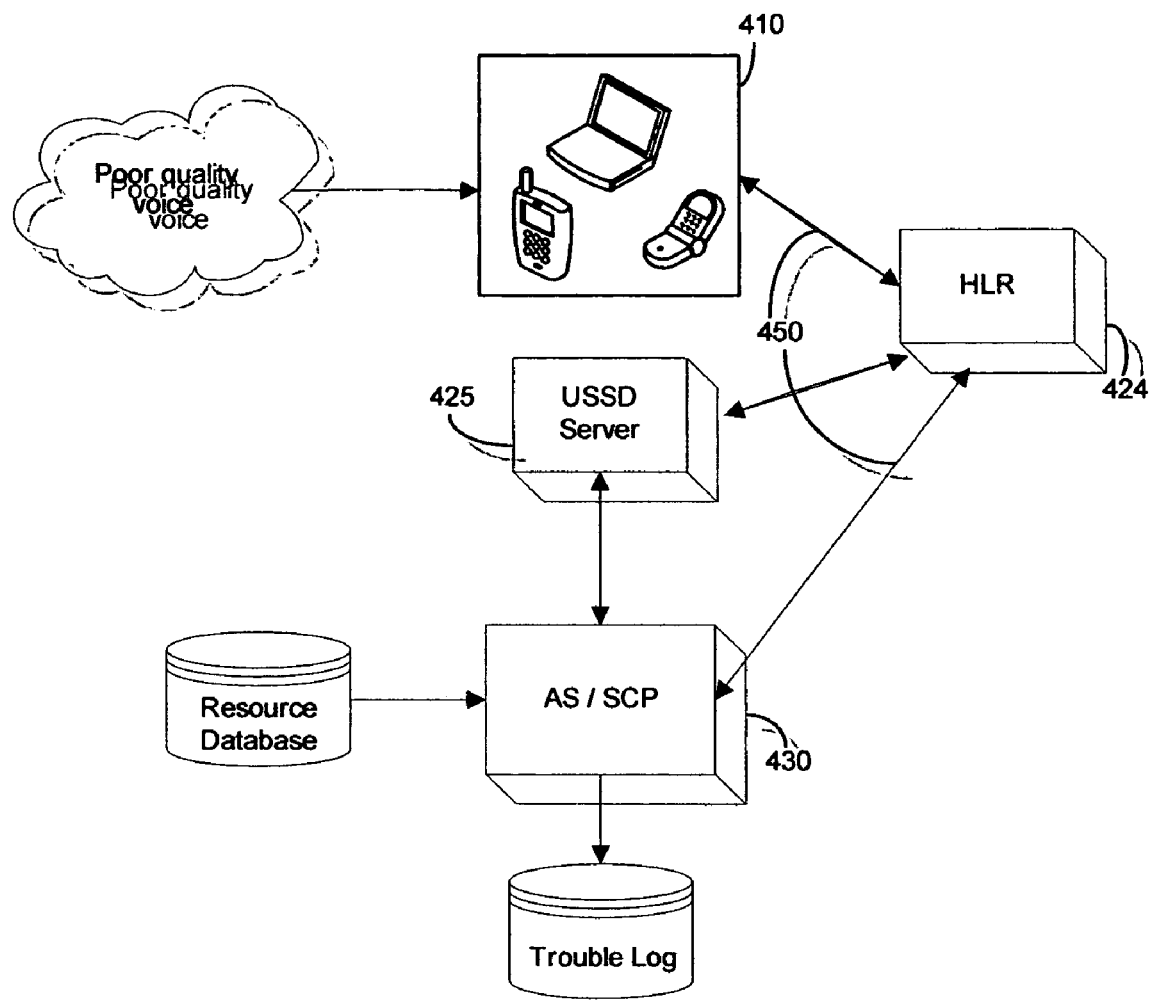
FIG. 4 shows a schematic of a process using USSD messaging to report poor voice quality, according to an exemplary embodiment of the present invention.

In another exemplary embodiment shown in FIG. 4, the client may use an Unstructured Supplementary Service Data (USSD) code to report a bad resource. The client is either informed of or programmed with a predefined code for reporting an error. USSD codes may be appropriate for reporting a poor quality voice call. In such a case, the user would punch in the USSD code and the phone number dialed, or the client's own phone number. The code could look like this: *123*cell# where *123 is the predefined error code and cell# is the client's cellular number or the dialed party's number. Alternatively, a USSD command could be used as a front-end for launching a text-based menu application that allows the client user to interactively select more details about the bad media. Advantages of using USSD include the fact that USSD capability is built into most GSM networks and is available to almost all existing GSM handsets, with no handset or SIM card upgrade necessary.

However, this invention is not restricted to currently existing protocols. One skilled in the art should be able to apply this concept to numerous existing and future protocols ranging from the PSTN SS7 protocols to SIP-like protocols involving instant messaging over IP networks.

The client 110 then sends the tag out 120 to the application server 130. On its way to the application server, the tag is routed through relevant network elements depending on the protocol being used. In the embodiment shown in FIG. 3, solid arrows 321 show a data transfer, dashed lines 322 show a SIP message. The SIP tag 320 will traverse multiple proxy servers 325 before it reaches the AS 331 and/or MRF 333. Once the tag reaches its SIP-enabled destination, there will be direct communication between the Client 310 and the MRF/AS 333/331, at which point more data can be transferred between the two using an appropriate transport protocol. Alternatively, the SIP message itself may contain the relevant information which is then processed by the MRF/AS 130.

In the USSD exemplary embodiment shown in FIG. 4, the message will reach a USSD server 425 via one or more Mobile Switching Centers (MSCs) and a Home Location Register (HLR) 424. The HLR routes the message to the Application Server or the Service Control Point 430 that manages the resource, thus opening a session 450 between the Client 410 and the AS/SCP 430. Alternatively, the HLR can route the message to the AS/SCP via a USSD Server 425.

The AS 331 is programmed to recognize the tag, combine it with additional data, and create a trouble log for all bad media events. Within the AS/MRF package 331/333, media resources are handled by the MRF 333 which consists of a Media Resource Function Controller (MRFC) and a Media Resource Function Processor (MRFP). The MRFC acts as a control layer which co-ordinates operations between the AS and the MRFP. When the application server requires media processing it sends a request to the MRFC which in turn manages the MRFP to invoke the media processing required for media transcoding, anchoring and streaming. The media resources are stored on a database 135, 335, e.g., a song or ring tone database.

In the exemplary embodiment shown in FIG. 3, the AS 331 instructs 336 the MRF 333 to retrieve specific information on the problem resource from the resource database 335. This could include the file type, size, version, attributes, DRM info, etc. The AS 331 then combines this information along with the information from the Client's tag to compile an error report. This report is stored in an event log, or trouble log 140, 340. The advent of software-based standalone IMS-compliant MRF servers adds to the flexibility of the system since the MRF can logically be placed at any point in the network chain. For instance, the client 310 can interact 334 with the MRF 333 to bolster its tag before submitting the tag 350 to the AS 331. Alternatively, the Client 310 can submit the tag to the MRF 333, which will add additional information before submitting the tag to the AS 331. The AS 331 will finally compile the report, adding any additional information, and store it in the trouble log 340.

At this point the bad media is properly tagged, and all tags are stored in a trouble log 140, 340. The trouble log 130, 340 provides a number of uses. The stored tag can be analyzed by a human who can review patterns of errors and troubleshoot them with accurate information. For instance, a certain model of mobile telephone may have trouble loading JPG images from the MRF. Perhaps members of area code 571 may be unable to receive personalized ring-back tones. These problems can be detected quickly with real-time tagging. Apart from a human review, the creation of a tag could initiate an automated quality check routine for the tagged resource. This automated routine, for example, could compare the tag with existing tags in the trouble log, and notify the administrator if the number of events for a certain resource reaches a pre-designated number x, or if pre-designated n number of subscribers encounter bad calls during peak hours. Many such scenarios are evident to one skilled in the art after consideration of the present disclosure and are thus within the scope of the present invention.

Meanwhile, the AS 130 can send a message 150 to the client 110, confirming receipt of the tag and that troubleshooting has begun. This message could be sent via SMS, voicemail, SIP email, or any equally user-friendly method. Also, since consumers are typically billed for certain media resources (e.g., MP3, JPEG, etc.), the AS/MRF could also refund money to users based on the problem with the media, or send them a message to please try again.

One of the many advantages of the present invention is that it enables media tagging to occur in real time. Faulty media can be tagged as soon as it is detected by the client (human or electronic). The client, AS, and MRF work together to get as much information as is relevant at the time the tagging is initiated. Mobile operators will also benefit from giving their subscribers access to these user-friendly customer services. Real-time tagging of bad media is an ideal way for operators to gain operational efficiency in their contact centers, with subscribers able to resolve day-to-day requests themselves. It also improves levels of customer service as IVR systems are sometimes an impersonal method of interacting with customers and indeed can result in poor customer service with subscribers being kept on hold for a lengthy period of time.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For example, the above configuration as shown and described may be used on WiFi and WIMAX networks as well as cellular using the above, similar or equivalent configuration. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A network system for communicating error details to a telecommunications operator, the network system comprising:
    a wireless device enabled to use one of a SIP protocol and a USSD messaging service, the wireless device capable of transmitting a message over a wireless network, the message being related to poor quality of one of a voice, video, audio, and multimedia resource, the message comprising a tag created by a user to signify a problem with a resource, the tag initiated by entering a predefined code within a certain period of time of the problem with the resource, the message including resource information that is available at the time including a date and a time, a client phone number, a model of the wireless device, an identification of the resource, and an error code indicating the resource as one of incompatible with the wireless device and offensive to the user;
    an Application Server on the wireless network that is capable of receiving the message, the Application Server including a Service Control Point on the wireless network; and
    a database containing additional information about the resource, capable of sending the additional information about the resource to the Application Server,
    wherein the Application Server is configured to combine the message with the additional information from the database and compile a report and refund money to the user based upon the problem with the resource.

2. The network system of claim 1, wherein the wireless device is a cellular phone, smartphone/PDA, or wireless-enabled computer.

3. The network system of claim 1, wherein the message traverses one or more network elements before reaching its destination.

4. The network system of claim 1, wherein the multimedia resources are controlled by a Media Resource Function.

5. A network system for communicating error details regarding voice and multimedia resources to a telecommunications operator, the network system comprising:
    a wireless device equipped to use one of a SIP protocol and a USSD messaging service, the wireless device capable of transmitting a message over a cellular network, the message being related to poor quality of one of a voice, video, audio, and multimedia resource, the message comprising a tag created by a user to signify a problem with a voice or media resource, the tag initiated by entering a predefined code within a certain period of time of the problem with the voice or media resource, the message including resource information that is available at the time including a date and a time, a client phone number, a model of the wireless device, an identification of the voice or media resource, and an error code indicating the resource as one of incompatible with the wireless device and offensive to the user;
    one or more proxy servers to route the message;
    an Application Server on the cellular network that is capable of receiving the message routed through the one or more proxy servers, the Application Server including a Service Control Point on the cellular network;
    a database containing information related to the voice or media resource;
    a retrieving unit that is capable of retrieving information from said database; and
    a combining unit that is configured to combine the resource details with the message to compile an error report,
    wherein the Application Server is capable of refunding money to the user based upon the problem with the voice or media resource.

6. The network system of claim 5, wherein the wireless device is a cellular phone, smartphone/PDA, or wireless-enabled computer.

7. The network system of claim 5, wherein the multimedia resource is controlled by a Media Resource Function.

8. A method for identifying problematic media resources in real time on a wireless communication network, the method comprising:
    recognizing a problematic media resource on a wireless device, the problematic media resource being related to poor quality of one of a voice, video, audio, and multimedia resource, the wireless device enabled to use one of a SIP protocol and a USSD messaging service;
    tagging the problematic media resource, the tag initiated by a user entering a predefined code within a certain period of time of the recognition of the problematic media resource;
    assembling a preliminary report containing error details, the preliminary report comprising the tag created by the user, the preliminary report including resource information that is available at the time including a date and a time, a client phone number, a model of the wireless device, an identification of the voice or media resource, and an error code indicating the resource as one of incompatible with the wireless device and offensive to the user;
    sending preliminary report over the network to an Application Server, the Application Server including a Service Control Point on the network;
    collecting related information from a media resource database;
    combining related information with the preliminary report to compile an error report;
    using said error report to diagnose the problem; and
    refunding money to the user based upon the problematic media resource.

9. The method of claim 8, wherein the preliminary report is transmitted using a proprietary or open telecommunications signaling protocol.

* * * * *